Patented May 15, 1934

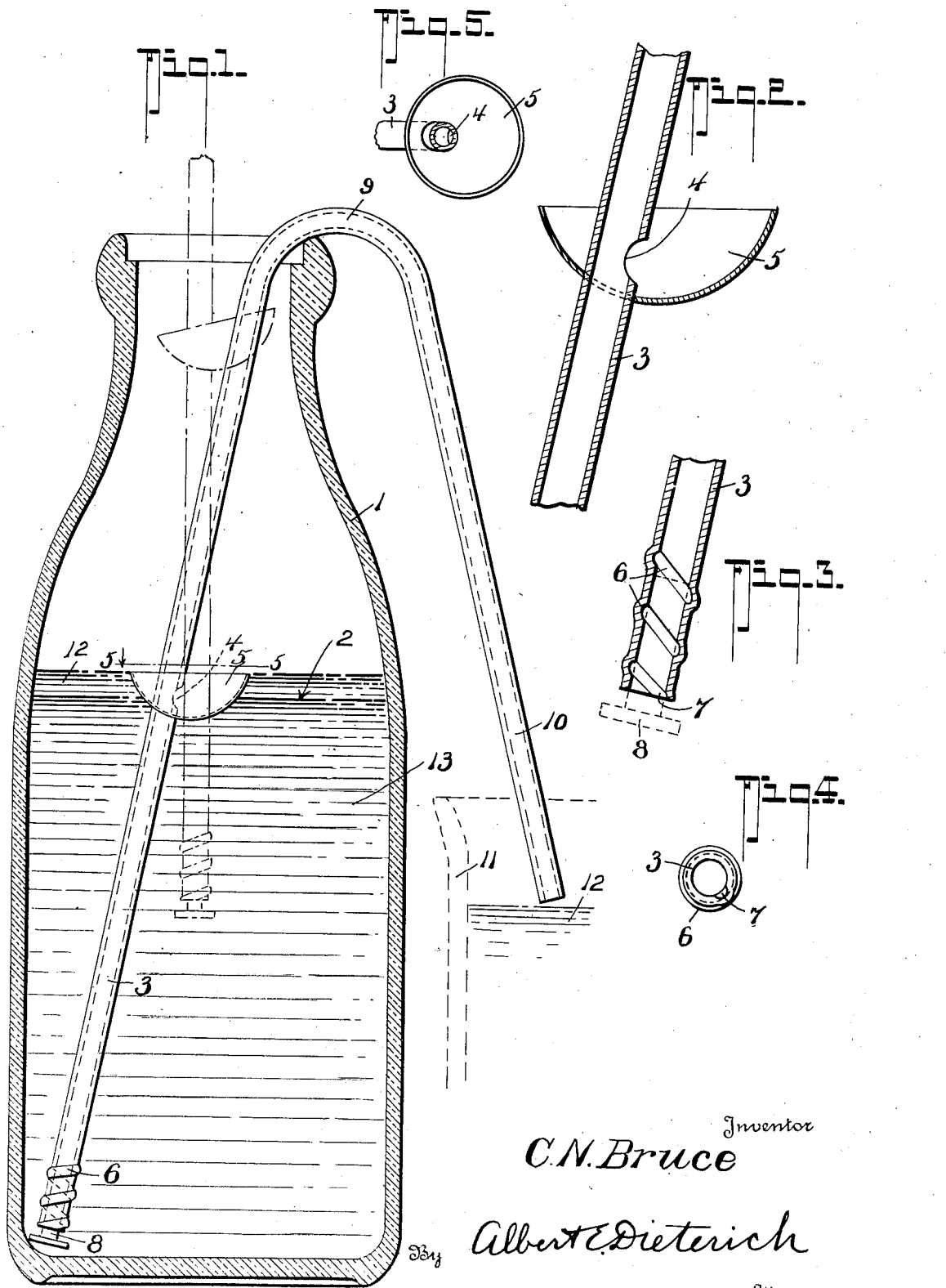

1,959,076

UNITED STATES PATENT OFFICE 1,959,076

SELF-STARTING SIPHON CREAM SEPARATOR

Challice Neiper Bruce, New Castle, Pa.

Application May 15, 1933, Serial No. 671,269

4 Claims. (Cl. 137—20)

My invention relates to means for removing cream from milk bottles and the like. Primarily the invention has for its object to provide a simple, inexpensive, easily cleanable device which will remove the cream from settled milk without drawing off any substantial part of the milk, so that the cream which has been removed may be whipped as whipping cream.

My invention therefore has been devised for overcoming the defects and deficiencies in the prior art devices to the end that the instant siphon separator carries over the whippable cream only, is inexpensive to construct, is easily cleaned, and is of the utmost simplicity both in construction and operation.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a vertical section of a quart size milk bottle with my invention in place, the cream having been removed.

Figure 2 is an enlarged detail section of a portion of the device showing the relation between the tube, the cup and the cream hole.

Figure 3 is an enlarged detail section of the lower end of the long leg of the siphon.

Figure 4 is an end view of the part shown in Figure 3.

Figure 5 is a section on the line 5—5 of Figure 1.

In the drawing in which like numerals and letters of reference designate like parts in all the figures, 1 represents the usual milk bottle and 2 the normal line of separation between the cream and the milk after settling.

My invention comprises a tube consisting of a long leg 3 and a short leg 10 united by a curved bend 9, giving the tube the form of a spread U. The long leg 3 of the tube is designed to be inserted into the milk bottle and lie inclined to the axis thereof, the bend 9 resting on the mouth of the bottle and the short leg 10 designed to deliver the cream 12 into a suitable receptacle 11.

The lower end of the tube 3 is provided with a grooved spiral 6 which at its lower end communicates at 7 with the exterior of the tube while its upper end communicates with the interior of the tube. A plug 8 is inserted and held frictionally in the lower end of the tube and is so designed that it cooperates with the spiral groove so as to form a spiral duct to convey milk slowly into the tube 3 to allow rapid displacement of the air entrapped therein, during insertion of the tube into the bottle.

The leg 3 of the tube at about the cream-milk separation line 2 is provided with a cream-entering hole 4 of relatively large dimension. A semi-spherical cup 5 is mounted on the tube and rigidly secured beneath the hole 4, the axis of the cup being offset from the axis of the leg 3 so that the cup and leg are relatively inclined to one another. The hole 4 is located in a position close to the bottom of the cup 5 adjacent the center thereof and below the upper edge of the cup. The angle between the axis of the cup and that of the tube is such that when the leg 3 is located in the milk bottle in the operative position shown in Figure 1, full lines, the upper edge of the cup 5 will lie a short distance above the cream-milk separation line 2 and will lie in a horizontal plane.

It is to be noted that the leg 3 of the tube is offset with respect to the axis of the cup 5 so that in inserting the device into the milk bottle the cup will be tilted (see dot and dash lines, Figure 1) and thus reduce agitation of the cream, due to the insertion, to a minimum.

In the drawing the milk is indicated by 13 and the cream by 12.

In use the long leg 3 of the siphon is put into the full bottle of milk in which the cream has separated by gravity, the insertion being made in the manner indicated by dot and dash lines of Figure 1.

The cup 5, being inclined to the axis of the leg 3, will enter the cream edgewise in such manner as to disturb the quiescence of the liquid as little as possible. When fully inserted the bend 9 of the siphon rests against the upper edge of the bottle with the legs of the tube inclined to the vertical and with the upper edge of the cup 5 lying horizontally.

The cup 5 is so located on the leg 3 of the tube that its upper edge lies slightly above the cream-milk separation line and hence the device will not draw off all the cream but will leave the bottom or weakest layer of cream on the milk.

The small milk aperture 7 is so proportioned to the large cream aperture 4 and the cross section of the tube that practically none of the milk will flow up the leg 3 to a greater height than the level of the hole 4.

As soon as the cream level falls to the top edge of the cup no more is withdrawn from the bottom around the cup but only that portion that remains within the cup continues to pass out until the aperture 4 has been uncovered; this leaves hardly a drop of cream in the cup and the final suction and agitation caused by the inrushing of the air in the hole 4 is not communicated to the cream surrounding the cup 5.

The siphon may be cleaned by removing the plug 8 and running water through the tube, or by a small brush inserted into the tube. The cup may also be readily cleaned by simply running water over it.

The spiral milk duct 6 serves to retard the inflow of milk while allowing a relatively rapid initial escape of entrapped air upwardly.

With my improved device I do not aim to remove all the cream, but it will remove all the cream above the cup from a bottle containing whole milk. It will remove the cream without removing any of the milk. This has been demonstrated by actual use of the invention since the cream removed by my apparatus comprises whipping cream and may be whipped under the same conditions as standard whipping cream, whereas with the use of the same milk and siphons of the prior art more or less of the milk is carried over with the cream, which prevents the cream from being whipped.

The cup is so placed to deflect the suction around the hole from sucking up milk. It is so placed off center as to centrally locate that suction and turbulent action within the cup. This action cannot be accomplished otherwise unless the cup be made so large that it will not enter the bottle or so large that it will enter but will stir the cream and milk together, thus again not accomplishing what it is intended to do.

The cup also is set at an agle so as to allow its insertion into the cream slightly edgewise and not flatwise, therefore producing the least stirring action.

Also the angle of the cup in relation to the tube is important as this allows the cup to assume the best position for its performance when the tube rests in its operating position which is at an angle in relation to the bottle and liquid.

If the center of that turbulent suction and mixing is not located within the center of the cup and in right relation to the angle of the cup, then the results are unsatisfactory, unless as stated the cup be so large as not to enter the bottle or to enter but so large that it will stir the cream and milk together.

From the foregoing description, taken in connection with the accompanying drawing, it is thought that the complete construction, arrangement, operation and advantages of my invention will be clear to those skilled in the art to which it relates.

What I claim is:

1. A self-starting siphon cream separator comprising a bent-over tube one leg of which is designed to lie within a bottle and is provided with a cream aperture in its side at approximately the cream-milk separation line, a cup located on the tube at an inclination thereto, the cream aperture lying adjacent the bottom of and within the cup, a removable plug in the lower end of said one leg of the tube, said tube having a spiral milk aperture adjacent the lower end of said one leg for the purposes described.

2. A self-starting siphon cream separator comprising a tube of two legs united by a bend, one of said legs serving to lie within a milk bottle, the lower end of said one leg having a spiral capillary duct, a removable plug located in said lower end to close the end of said tube except for the end of the spiral duct, the lower end of said duct communicating with the outside of the tube and the upper end of the duct communicating with the inside of the tube, said tube having a cream aperture located at about the level of the normal cream-milk separation line, and a cup secured to said tube below said cream aperture and having its upper edge located above the cream-milk separation line for the purposes described.

3. A self-starting siphon cream separator comprising a tube of two legs united by a bend, one of said legs serving to lie within a milk bottle, the lower end of said one leg having a spiral capillary duct, a removable plug located in said lower end to close the end of said tube except for the end of the spiral duct, the lower end of said duct communicating with the outside of the tube and the upper end of the duct communicating with the inside of the tube, said tube having a cream aperture located at about the level of the normal cream-milk separation line, and a cup secured to said tube below said cream aperture and having its upper edge located above the cream-milk separation line, said tube passing through said cup to one side of and inclined to the axis of the cup at such an angle that when the device is in use the leg within the bottle will lie at an inclination to the vertical and the top of the cup will lie horizontally, the cream aperture being in the low side of the leg of the tube and adjacent the bottom center of the cup.

4. A self-starting siphon cream separator comprising a U-tube the legs of which are diverged from the bend, one leg being designed to lie inclined to the vertical within a milk bottle while the bend lies over the mouth thereof, said one leg having its lower end obstructed against free passage of liquid into the same, said one leg having a cream-entering aperture in its side at approximately the cream-milk separation line, a semi-spherical cup located on said one leg with its bottom below the cream aperture thereof and its top edge above said aperture, said cup having its axis offset to and so inclined to the axis of said one leg that when the device is in action the upper edge of the cup will lie horizontally substantially as shown and described.

CHALLICE NEIPER BRUCE.